United States Patent
Esna Ashari Esfahani et al.

(10) Patent No.: US 12,172,669 B2
(45) Date of Patent: Dec. 24, 2024

(54) AUTOMATED DRIVING SYSTEM WITH DESIRED LEVEL OF DRIVING AGGRESSIVENESS

(71) Applicant: GM Global Technology Operations LLC, Detroit, MI (US)

(72) Inventors: Alireza Esna Ashari Esfahani, Novi, MI (US); Sayyed Rouhollah Jafari Tafti, Troy, MI (US); Marcus James Huber, Saline, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 424 days.

(21) Appl. No.: 17/555,973

(22) Filed: Dec. 20, 2021

(65) Prior Publication Data
US 2023/0192118 A1    Jun. 22, 2023

(51) Int. Cl.
*B60W 60/00* (2020.01)
*B60W 40/09* (2012.01)
*G05D 1/00* (2006.01)

(52) U.S. Cl.
CPC .......... *B60W 60/001* (2020.02); *B60W 40/09* (2013.01); *G05D 1/0088* (2013.01); *G05D 1/0221* (2013.01); *G05D 1/10* (2013.01); *B60W 2540/30* (2013.01)

(58) Field of Classification Search
CPC ............... B60W 60/001; B60W 40/09; B60W 2540/30; B60W 50/082; B60W 60/0021; B60W 2050/0088; G05D 1/0088; G05D 1/0221; G05D 1/10; G05D 1/024; G05D 1/0276; G05D 1/0278; G05D 1/028
See application file for complete search history.

(56) References Cited

U.S. PATENT DOCUMENTS

| | | | |
|---|---|---|---|
| 11,691,634 B1* | 7/2023 | Zhou | B60W 50/0097 701/93 |
| 2018/0022350 A1* | 1/2018 | McNew | B60W 30/182 701/23 |
| 2018/0057015 A1* | 3/2018 | Barke | B60W 50/085 |
| 2020/0005395 A1* | 1/2020 | Abdollahian | G06Q 40/06 |
| 2020/0148195 A1* | 5/2020 | Kassar | B60W 40/09 |
| 2020/0293041 A1* | 9/2020 | Palanisamy | G06N 3/045 |
| 2021/0253128 A1* | 8/2021 | Nister | G06N 7/01 |
| 2021/0294323 A1* | 9/2021 | Bentahar | B60W 50/00 |
| 2021/0339759 A1* | 11/2021 | Fouad | B60W 50/14 |
| 2021/0354726 A1* | 11/2021 | Bill | B60W 60/00 |
| 2022/0147051 A1* | 5/2022 | Li | G06N 3/045 |
| 2022/0348204 A1* | 11/2022 | Wang | B60W 60/0013 |

* cited by examiner

*Primary Examiner* — Donald J Wallace
(74) *Attorney, Agent, or Firm* — Vivacqua Crane, PLLC

(57) ABSTRACT

A system comprises a computer including a processor and a memory. The memory includes instructions such that the processor is programmed to: receive sensor data representing a perceived driving environment, select a reinforcement learning agent from a plurality of reinforcement learning agents based on a challenge score calculated using the sensor data and a desired driving style, and generate, via the selected reinforcement learning agent, a driving action based on the sensor data.

20 Claims, 7 Drawing Sheets

AUTOMATED DRIVING SYSTEM WITH DESIRED LEVEL OF DRIVING AGGRESSIVENESS

INTRODUCTION

The present disclosure relates to selecting a reinforcement learning agent to operate a vehicle based on a sensed driving environment and a user preference.

Reinforcement learning systems include an agent that interacts with an environment by performing actions that are selected by the reinforcement learning system in response to receiving observations that characterize the current state of the environment.

SUMMARY

A system comprises a computer including a processor and a memory. The memory includes instructions such that the processor is programmed to: receive sensor data representing a perceived driving environment, select a reinforcement learning agent from a plurality of reinforcement learning agents based on a challenge score calculated using the sensor data and a desired driving style, and generate, via the selected reinforcement learning agent, a driving action based on the sensor data.

In other features, each reinforcement learning agent of the plurality of reinforcement learning agents corresponds to a different challenge score and desired driving style.

In other features, the desired driving style corresponds to desired level of driving aggressiveness.

In other features, the desired level of driving aggressiveness corresponds to completing the driving action within a particular time period.

In other features, the plurality of reinforcement learning agents comprise M×N reinforcement learning agents, where M is an integer representing M levels of driving preferences and N is an integer representing N number of driving environments.

In other features, the processor is further programmed to automatically select another reinforcement learning agent from the plurality of reinforcement learning agents based on the sensor data representing a different perceived driving environment.

In other features, the desired driving style is received from a user.

In other features, the desired driving style is received from at a human-machine interface (HMI).

In other features, a vehicle is operated according to the driving action.

In other features, the vehicle comprises at least one of a land vehicle, an aerial vehicle, or an aquatic vehicle.

A method includes receiving sensor data representing a perceived driving environment, selecting a reinforcement learning agent from a plurality of reinforcement learning agents based on a challenge score calculated using the sensor data and a desired driving style, and generating, via the selected reinforcement learning agent, a driving action based on the sensor data.

In other features, each reinforcement learning agent of the plurality of reinforcement learning agents corresponds to a different challenge score and desired driving style.

In other features, the desired driving style corresponds to desired level of driving aggressiveness.

In other features, the desired level of driving aggressiveness corresponds to completing the driving action within a particular time period.

In other features, the plurality of reinforcement learning agents comprise M×N reinforcement learning agents, where M is an integer representing M levels of driving preferences and N is an integer representing N number of driving environments.

In other features, the method includes automatically selecting another reinforcement learning agent from the plurality of reinforcement learning agents based on the sensor data representing a different perceived driving environment.

In other features, the desired driving style is received from a user.

In other features, the desired driving style is received from at a human-machine interface (HMI).

In other features, the method includes operating according to the driving action.

In other features, the vehicle comprises at least one of a land vehicle, an aerial vehicle, or an aquatic vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Reinforcement Learning (RL) is a form of goal-directed machine learning. For example, an agent can learn from direct interaction with its environment without relying on explicit supervision and/or complete models of the environment. Reinforcement learning is a framework modeling the interaction between a learning agent and its environment in terms of states, actions, and rewards. At each time step, an agent receives a state, selects an action based on a policy, receives a scalar reward, and transitions to the next state. The state can be based on one or more sensor inputs indicative of the environmental data. The agent's goal is to maximize an expected cumulative reward. The agent may receive a positive scalar reward for a positive action and a negative scalar reward for a negative action. Thus, the agent "learns" by attempting to maximize the expected cumulative reward. While the agent is described within the context of a vehicle herein, it is understood that the agent may comprise any suitable reinforcement learning agent.

As discussed in greater detail herein, a vehicle may include multiple reinforcement learning agents. Each reinforcement learning agent is trained to generate output representing a driving action based on a challenge score corresponding to a difficulty perceived by a sensed driving environment and a user selection representing a desired level of driving aggressiveness. The desired level can correspond to a preferred driving style of the user, such as a relatively conservative driving style or a relatively aggressive driving style.

Figure 1:
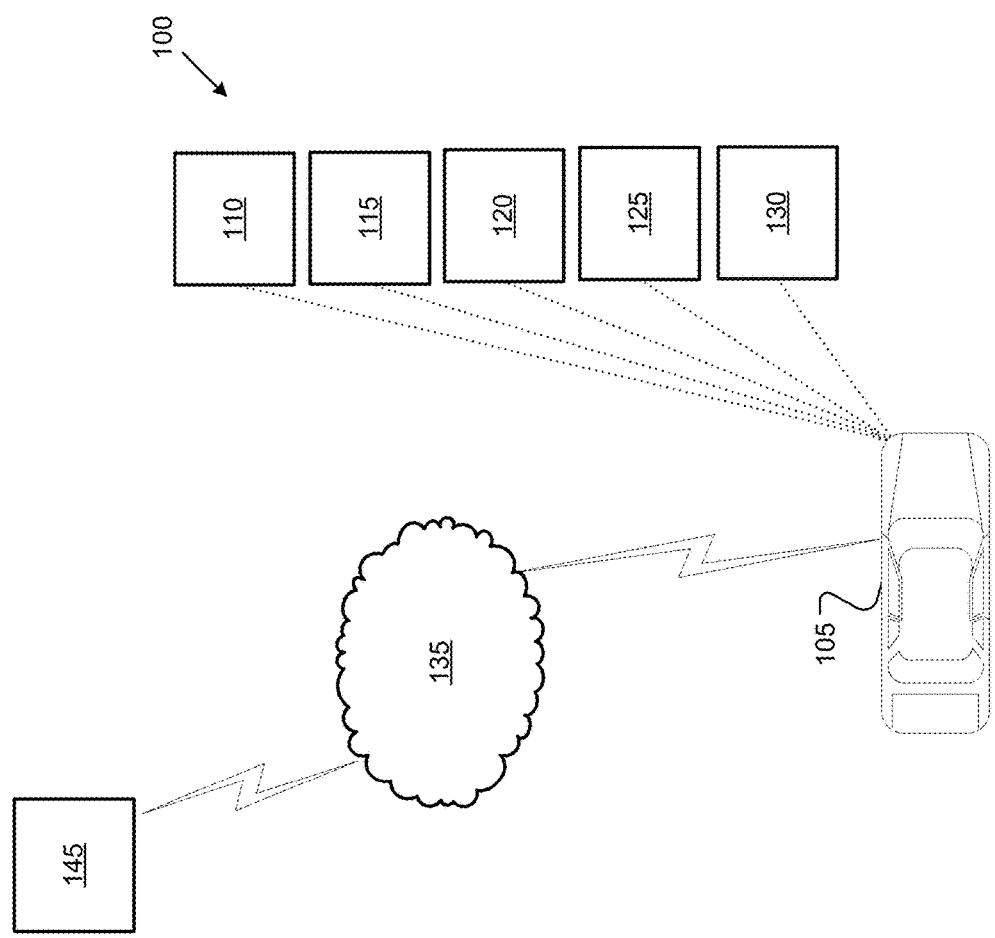
FIG. 1 is a block diagram of an example system including a vehicle.

FIG. 1 is a block diagram of an example vehicle system 100. The system 100 includes a vehicle 105, which can comprise a land vehicle such as a car, truck, etc., an aerial vehicle, and/or an aquatic vehicle. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110. The vehicle 105 communications network can include one or more gateway modules that provide interoperability between various networks and devices within the vehicle 105, such as protocol translators, impedance matchers, rate converters, and the like.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g., front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation-such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle to vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short-range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

As described in greater detail herein, the computer 110 is configured to implement a neural network-based reinforcement learning procedure. The computer 110 generates a set of state-actions (Q-values) as outputs for an observed input state. The computer 110 can select an action corresponding to a maximum state-action value, e.g., the highest state-action value. The computer 110 obtains sensor data from the sensors 115 that corresponds to an observed input state.

Figure 2:
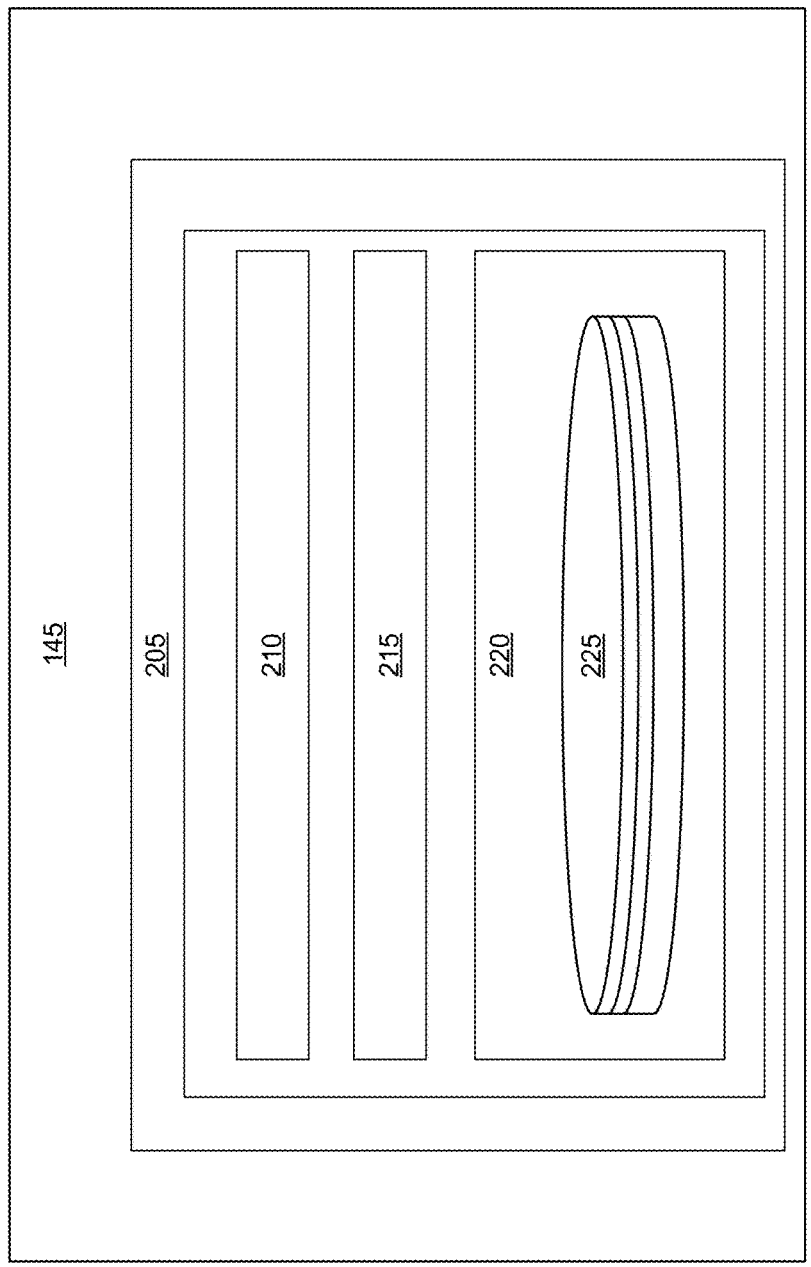
FIG. 2 is a block diagram of an example server within the system.

FIG. 2 illustrates an example server 145 that includes a reinforcement learning (RL) system 205. As shown, the RL system 205 may include a reinforcement learning (RL) agent module 210, one or more RL agents 215, and a storage module 220.

In particular, the RL agent module 210 can manage, maintain, train, implement, utilize, or communicate with one or more RL agents 215. For example, the RL agent module 210 can communicate with the storage module 220 to access one or more RL agents 215. The RL agent module 210 can also access data specifying a different number of learner policies, which is described in greater detail below with respect to FIG. 5.

Figure 3:
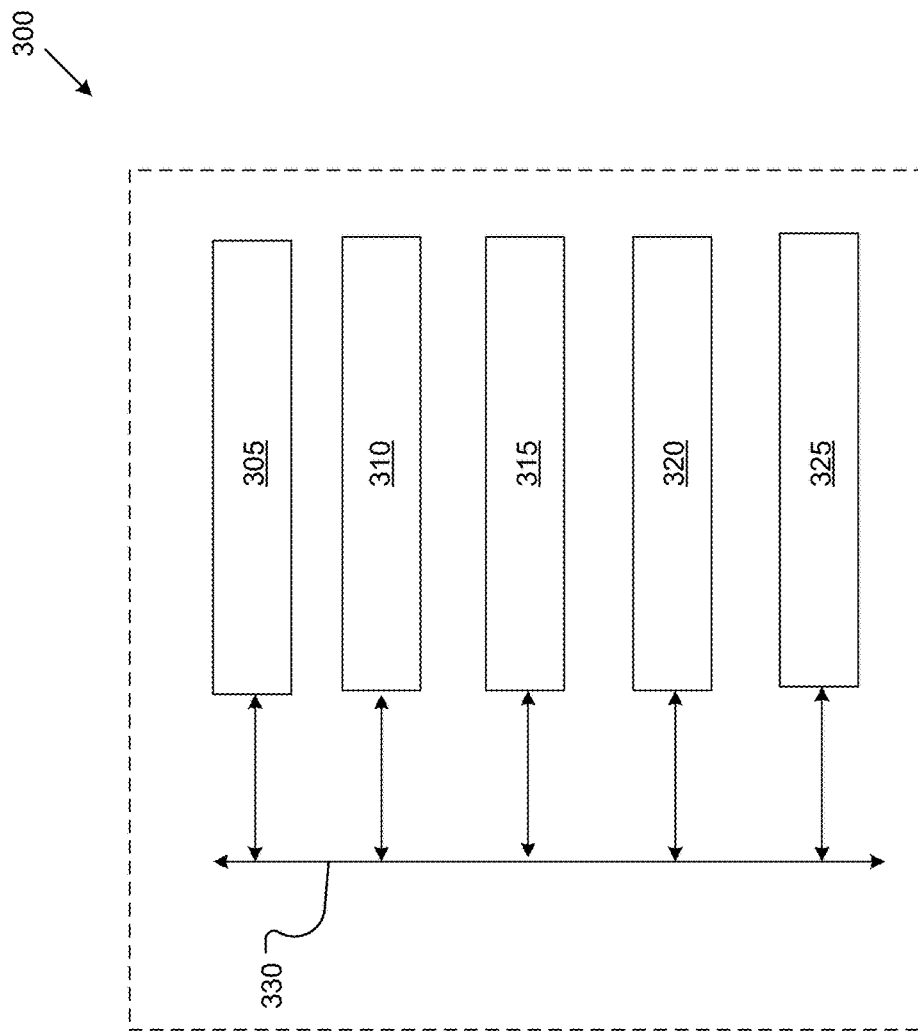
FIG. 3 is a block diagram of an example computing device.

FIG. 3 illustrates an example computing device 300 i.e., computer 110 and/or server(s) 145 that may be configured to perform one or more of the processes described herein. As shown, the computing device can comprise a processor 305, memory 310, a storage device 315, an I/O interface 320, and a communication interface 325. Furthermore, the computing device 300 can include an input device such as a touchscreen, mouse, keyboard, etc. In certain implementations, the computing device 300 can include fewer or more components than those shown in FIG. 3.

In particular implementations, processor(s) 305 includes hardware for executing instructions, such as those making up a computer program. As an example, and not by way of limitation, to execute instructions, processor(s) 305 may retrieve (or fetch) the instructions from an internal register, an internal cache, memory 310, or a storage device 315 and decode and execute them.

The computing device 300 includes memory 310, which is coupled to the processor(s) 305. The memory 310 may be used for storing data, metadata, and programs for execution by the processor(s). The memory 310 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 310 may be internal or distributed memory.

The computing device 300 includes a storage device 315 includes storage for storing data or instructions. As an example, and not by way of limitation, storage device 315 can comprise a non-transitory storage medium described above. The storage device 315 may include a hard disk drive (HDD), flash memory, a Universal Serial Bus (USB) drive or a combination of these or other storage devices.

The computing device 300 also includes one or more input or output ("I/O") devices/interfaces 320, which are provided to allow a user to provide input to (such as user strokes), receive output from, and otherwise transfer data to and from the computing device 300. These I/O devices/interfaces 320 may include a mouse, keypad or a keyboard, a touch screen, camera, optical scanner, network interface, modem, other known I/O devices or a combination of such I/O devices/interfaces 320. The touch screen may be activated with a writing device or a finger.

The I/O devices/interfaces 320 may include one or more devices for presenting output to a user, including, but not limited to, a graphics engine, a display (e.g., a display screen), one or more output drivers (e.g., display drivers), one or more audio speakers, and one or more audio drivers. In certain implementations, devices/interfaces 320 is configured to provide graphical data to a display for presentation to a user. The graphical data may be representative of one or more graphical user interfaces and/or any other graphical content as may serve a particular implementation.

The computing device 300 can further include a communication interface 325. The communication interface 325 can include hardware, software, or both. The communication interface 325 can provide one or more interfaces for communication (such as, for example, packet-based communication) between the computing device and one or more other computing devices 300 or one or more networks. As an example, and not by way of limitation, communication interface 325 may include a network interface controller (NIC) or network adapter for communicating with an Ethernet or other wire-based network or a wireless NIC (WNIC) or wireless adapter for communicating with a wireless network, such as a WI-FI. The computing device 300 can further include a bus 330. The bus 330 can comprise hardware, software, or both that couples components of computing device 300 to each other.

Figure 4:
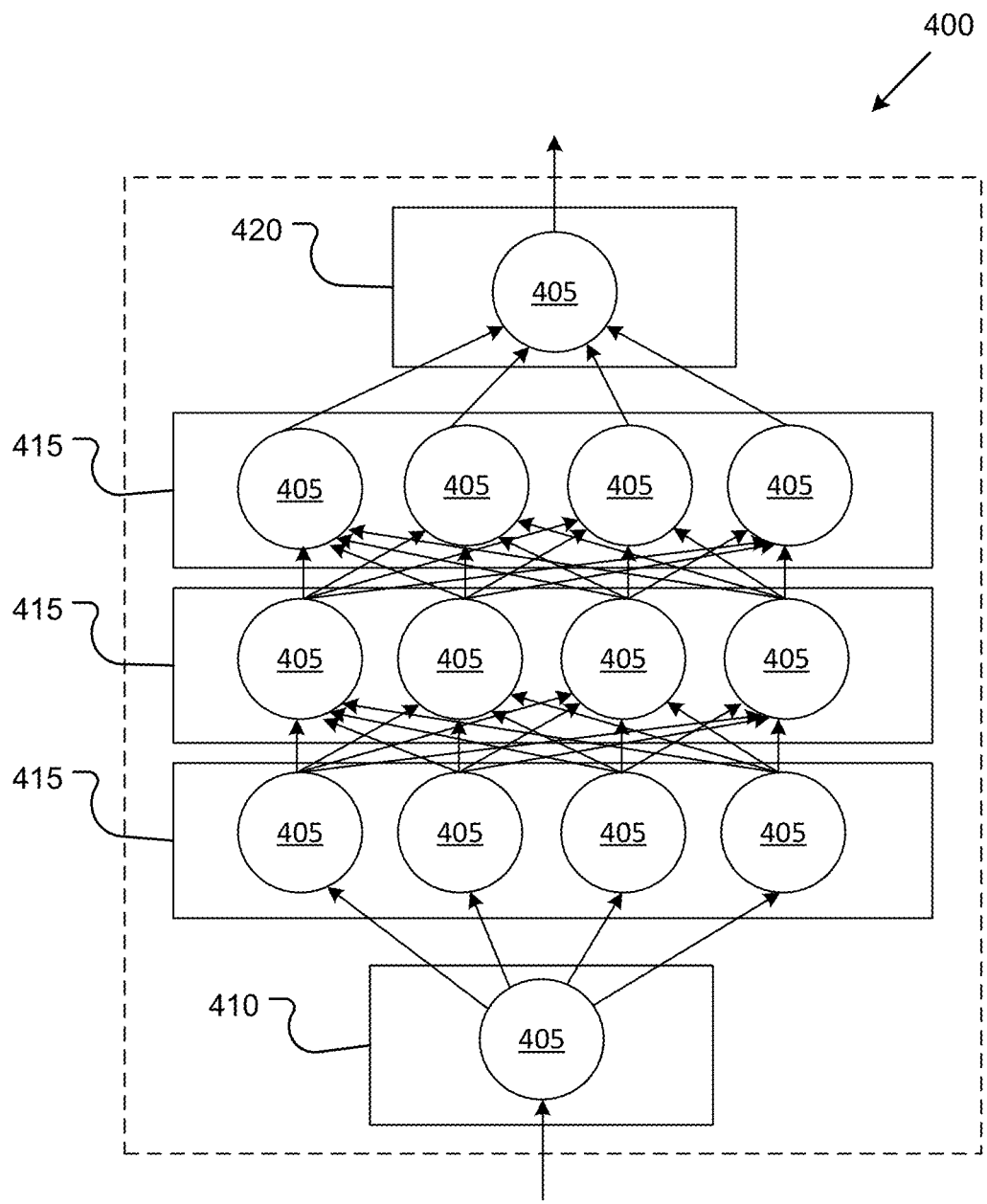
FIG. 4 is a diagram of an example neural network.

FIG. 4 is a diagram of an example deep neural network (DNN) 400 that may be used herein. Within the present context, the DNN 400 may comprise a single RL agent 215 The DNN 400 includes multiple nodes 405, and the nodes 405 are arranged so that the DNN 400 includes an input layer 410, one or more hidden layers 415, and an output layer 420. Each layer of the DNN 400 can include a plurality of nodes 405. While FIG. 4 illustrates three (3) hidden layers 415, it is understood that the DNN 400 can include additional or fewer hidden layers. The input and output layers 410, 420 may also include more than one (1) node 405.

The nodes 405 are sometimes referred to as artificial neurons, because they are designed to emulate biological, e.g., human, neurons. A set of inputs (represented by the arrows) to each node 405 are each multiplied by respective weights. The weighted inputs can then be summed in an input function to provide, possibly adjusted by a bias, a net input. The net input can then be provided to activation function, which in turn provides a connected node 405 an output. The activation function can be a variety of suitable functions, typically selected based on empirical analysis. As illustrated by the arrows in FIG. 4, node 405 outputs can then be provided for inclusion in a set of inputs to one or more neurons 305 in a next layer.

The DNN 400 can be trained to accept sensor data as input and generate a output-action, e.g., reward value, based on the input. The DNN 400 can be trained with training data, e.g., a known set of sensor inputs, to train the agent for the purposes of determining an optimal policy. In one or more implementations, the DNN 400 is trained via the server 145, and the trained DNN 400 can be transmitted to the vehicle 105 via the network 135. Weights can be initialized by using a Gaussian distribution, for example, and a bias for each neuron 405 can be set to zero. Training the DNN 400 can including updating weights and biases via suitable techniques such as back-propagation with optimizations.

During operation, the computer 110 obtains sensor data from the sensors 115 and provides the data as input to the DNN 400, e.g., the RL agent(s) 215. Once trained, the RL agent 215 can accept the sensor input and provide, as output, one or more state-action values (Q-values) based on the sensed input. During execution of the RL agent 215, the state-action values can be generated for each action available to the agent within the environment. In an example implementation, the RL agent 215 is trained according to a baseline policy. The baseline policy can include one or more state-action values corresponding to a set of sensor input data corresponding to a baseline driving environment.

In other words, once a RL agent 215 has been trained, it generates output data reflective of its decisions to take particular actions in response to particular input data. Input data includes, for example, values of a plurality of state variables relating to an environment being explored by the RL agent 215 or a task being performed by the RL agent 215. In some cases, one or more state variables may be one-dimensional. In some cases, one or more state variables may be multi-dimensional. A state variable may also be referred to as a feature. The mapping of input data to output data may be referred to as a policy, and governs decision-making of the RL agent 215. A policy may, for example, include a probability distribution of particular actions given particular values of state variables at a given time step.

Figure 5:
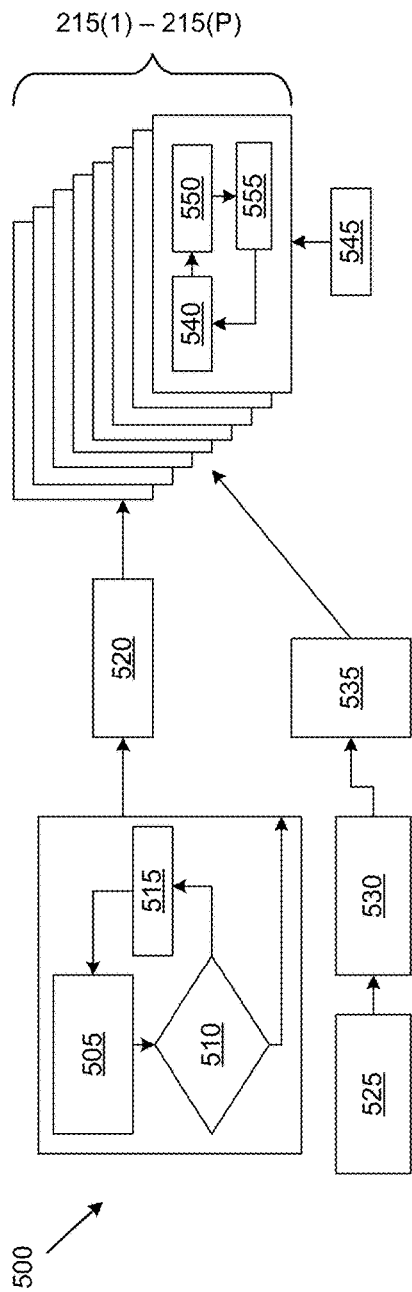
FIG. 5 is a diagram illustrating an example process for training multiple reinforcement learning agents.

FIG. 5 illustrates an example process 500 for initializing each RL agent 215 at the server 145. Blocks of the process 500 can be executed by the server 145. At block 505, the RL agent 215 is trained according to the baseline policy.

At block 510, a determination is made whether a mean reward value has converged. If the mean reward value has not converged, one or more hyperparameters are modified and provided to the RL agent 215 at block 515. A hyperparameter is a value that is initialized prior to the commencement of the training and modified during the training of the RL agent 215 and that impacts the training process of the RL agent 215 For instance, a hyperparameter can comprise reward hyperparameters that comprise feedback or observations used by the RL agent 215 to determine an appropriate state-action according to the sensor data. Otherwise, at block 520, the RL agent 215 is copied based on the baseline policy and/or modified hyperparameters that provided in a converged mean reward value. It is understood that a driving environment may comprise M levels of driving preferences, e.g., desired level of driving aggressiveness.

At block 525, N number of driving environments are generated using a prescriptive analytical framework, where M and N are integers greater than or equal to one (1). At block 530, a descriptive challenge score is calculated that corresponds to one of the driving environments generated at block 525. In an example implementation, the descriptive challenge score can be generated using a descriptive analytical framework. The descriptive challenge score can comprise a quantified difficulty rating corresponding to the driving environment. It is understood that the challenge score may be calculated based on a perceived traffic environment, weather conditions, i.e., inclement weather, snow-covered road surface, roadway congestion, upcoming planned maneuvers, etc.

At block 535, the N number of driving environments are sorted and provided to the RL agents 215. For example, the N number of driving environments are sorted according to the descriptive challenge score. As shown in FIG. 5, M×N number of RL agents 215, e.g., RL agents 215-1 through 215-P can be generated according to the steps described above, where P is the value of M×N.

At block 540, a reward value for an RL agent 215 is set and/or updated. Initially, the reward value can be set to the converged mean reward value described above in block 510. At block 545, one or more weights are generated according to an initial benchmarking score and provided to each RL agent 215. For example, one or more weights are calculated according to a desired aggressiveness level. For example, the desired aggressiveness level may represent completing a driving action within a particular time given the sensed environment. In another example, the desired aggressiveness level may comprise avoiding stop-and-run actions given the sensed environment.

At block 550, each RL agent 215 can be trained for a predetermined number of epochs. For example, each RL agent 215 is provided data representing a particular driving environment as input and generates an output representing a driving action within a particular driving environment. The resulting output can represent an updated benchmarking score. At block 555, the updated benchmarking score can be compared to previous scores to determine whether one or more reward values need to be updated. If the comparison is greater than a predetermined difference threshold, the reward values are updated and the process 500 returns to block 550. It is understood that the process 500 may be performed offline.

Figure 6:
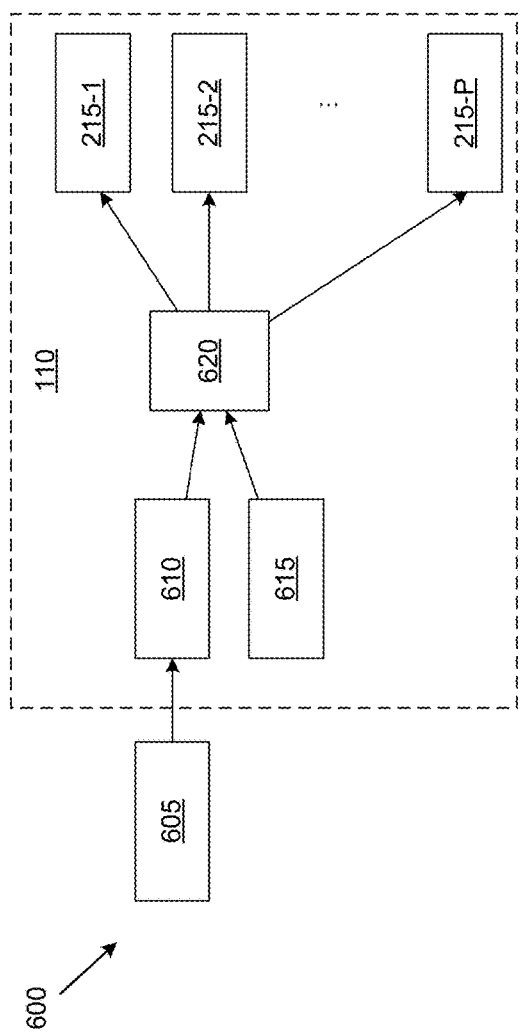
FIG. 6 is a block diagram illustrating an example reinforcement learning system for selecting a reinforcement learning agent from multiple reinforcement learning agents to operate a vehicle.

FIG. 6 is an example environment 600 for operating the vehicle 105. As such, the computer 110 receives sensed data 605 representing an observed environment. The sensed data 605 is generated by the vehicle sensors 115. The computer 110 calculates a challenge score 610 based on the sensed data 605. The challenge score 610 can represent a driving difficulty corresponding to sensed driving environment, i.e., number of other vehicles proximate to the vehicle 105, traffic congestion, etc.

The computer 110 also receives a user selection representing a desired driving style 615, i.e., desired driving aggressiveness preference. For example, a first desired driving style 615 can correspond to performing driving actions that favors caution. In another example, a second desired driving style 615 can correspond to performing driving actions that favor conserving travel time. The user selection can be received via an HMI, such as a vehicle component 125, a remote computing device, or the like. In some implementations, the computer 110 can suggest modifying the desired driving style 615 based on the driving environment. For example, the computer 110 may calculate a challenge score 610 based on the perceived driving environment. The computer 110 may access a lookup table that relates a challenge score 610 to acceptable driving aggressive preferences 615 determined during training of the RL agents 215.

The computer 110 can then use a selector module 620 that selects one of P number of stored RL agents 215. For example, the selector module 620 selects a RL agent 215 based on the challenge score 610 and the desired driving style 615. The selected RL agent 215 can generate output representing driving actions that are provided to the vehicle actuators 120 to operate the vehicle 105 accordingly. In some implementations, the computer 110 may automatically select an RL agent 215 based on a calculated challenge score 610. For example, the computer 110 may determine, based on the perceived driving environment, that the current driving aggressive preferences 615 does not correspond to the calculated challenge score 610. In this example, the computer 110 suggests to the passenger(s) to modify the desired driving style 615 to a proper level via the HMI.

Figure 7:
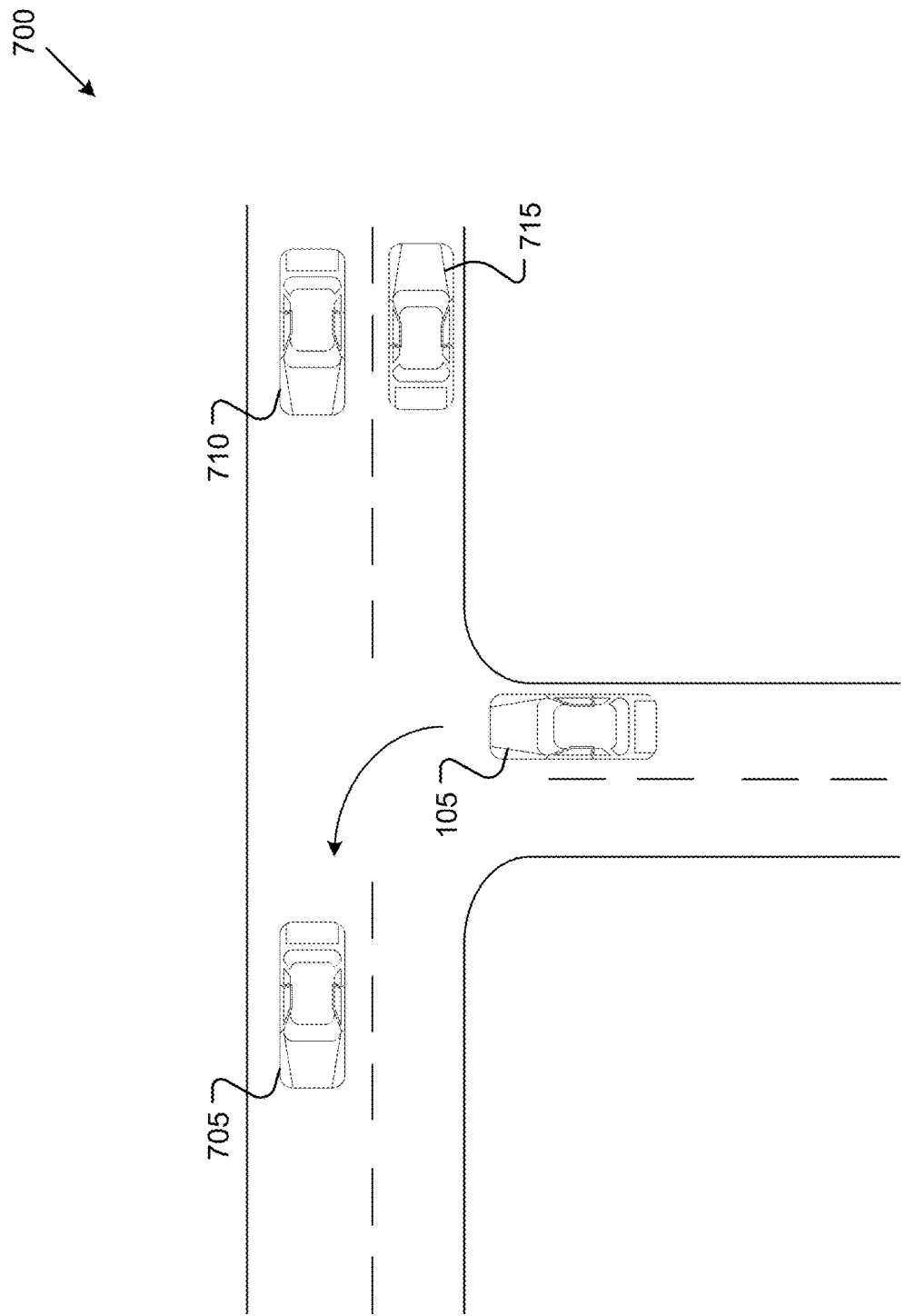
FIG. 7 is a plan view of an example driving environment.

FIG. 7 illustrates an example driving environment 700. As shown, the environment 700 includes the vehicle 105, e.g., the ego-vehicle, and vehicles 705, 710, 715. As described herein, one or more vehicle sensors 115 generate sensor data representing the sensed driving environment. Based on the sensed driving environment, the computer 110 can calculate a challenge score representing a driving difficulty within the sensed driving environment. Based on the challenge score and a preference of the user, the computer 110 selects a RL agent 215 that determine one or more driving actions to perform within the environment 700.

Figure 8:
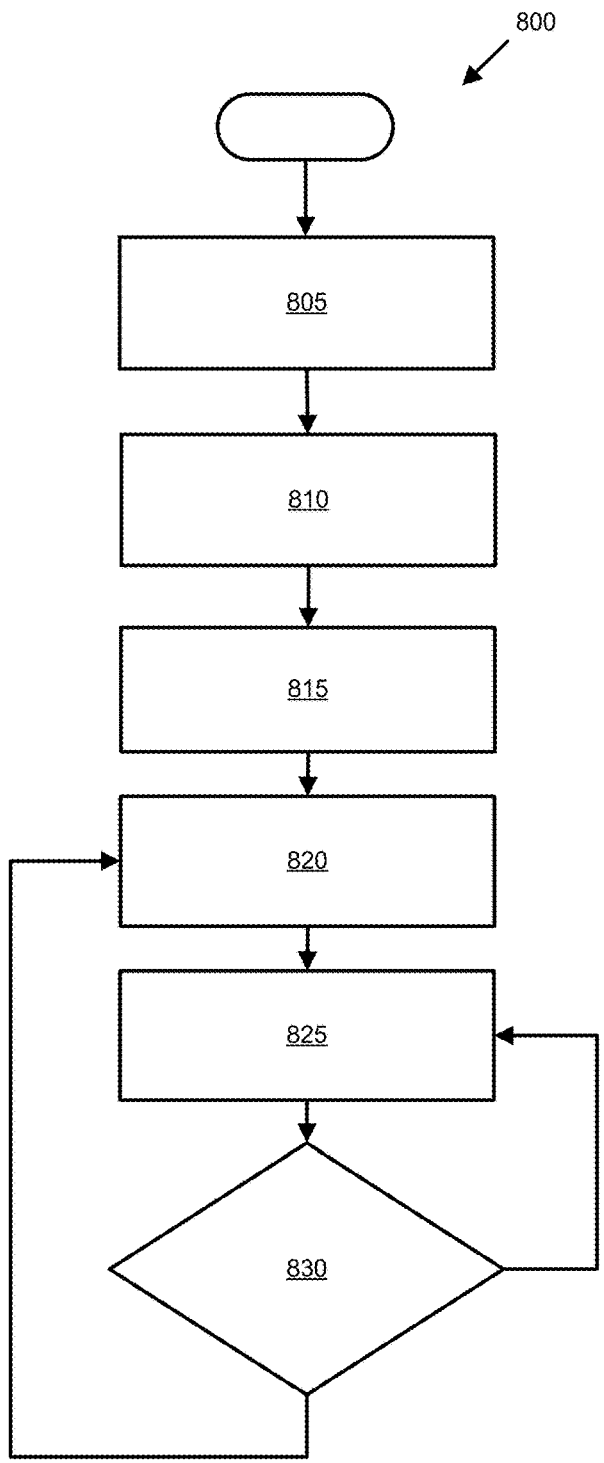
FIG. 8 is a flow diagram illustrating an example process for selecting a reinforcement learning agent from multiple reinforcement learning agents to operate a vehicle.

FIG. 8 is a flowchart of an example process 800 for operating the vehicle 105 according to the techniques described herein. Blocks of the process 800 can be executed by the computer 110. The process 800 begins at block 805 in which sensed data representing a driving environment is received. At block 810, a challenge score is calculated based on the received data. At block 815, a user selection representing a desired driving style is received.

At block 820, a RL agent 215 is selected from a P number of RL agents 215. At block 825, RL agent 215 generates a driving action based on the sensed data. At block 830, a determination is made whether an updated user selection has been received. If an updated user selection has been received, the process 800 returns to block 820. Otherwise, the process 800 returns to block 825.

The description of the present disclosure is merely exemplary in nature and variations that do not depart from the gist of the present disclosure are intended to be within the scope of the present disclosure. Such variations are not to be regarded as a departure from the spirit and scope of the present disclosure.

In general, the computing systems and/or devices described may employ any of a number of computer operating systems, including, but by no means limited to, versions and/or varieties of the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain implementations, and should in no way be construed so as to limit the claims.

Accordingly, it is to be understood that the above description is intended to be illustrative and not restrictive. Many implementations and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future implementations. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer within a host vehicle, the computer including a processor and a memory, the memory including instructions such that the processor is programmed to:
receive sensor data representing a perceived driving environment surrounding the host vehicle;
receive input from a user selecting a desired driving style from a plurality of driving styles;
calculate a calculated challenge score from a plurality of challenge scores based on the perceived driving environment;
select a reinforcement learning agent from a plurality of reinforcement learning agents based on the calculated challenge score and the desired driving style, wherein each of the plurality of reinforcement learning agents is trained to model the perceived driving environment differently based on a particular combination of one of the plurality of challenge scores and one of the plurality of driving styles; and
generate, via the selected reinforcement learning agent, a driving action based on the sensor data.

2. The system of claim 1, wherein the sensed driving environment includes a perceived traffic environment that includes a number of other vehicles proximate the host vehicle, and the challenge score is calculated at least in part based on the perceived traffic environment.

3. The system of claim 1, wherein the desired driving style corresponds to desired level of driving aggressiveness.

4. The system of claim 3, wherein the desired level of driving aggressiveness corresponds to completing the driving action within a particular time period.

5. The system of claim 1, wherein the plurality of reinforcement learning agents comprise M×N reinforcement learning agents, where M is an integer representing M levels of driving preferences and N is an integer representing N number of driving environments.

6. The system of claim 4, wherein the processor is further programmed to automatically select another reinforcement learning agent from the plurality of reinforcement learning agents based on the sensor data representing a different perceived driving environment and a different challenge score within the particular time period.

7. The system of claim 4, wherein the processor is further programmed to generate, at the end of the particular time period, a reward value quantifying the driving action generated by the selected reinforcement agent.

8. The system of claim 1, wherein the processor is further programmed to determine, based on the perceived driving environment, that the desired driving style does not correspond to the calculated challenge score and to suggest to the user to modify the desired driving style to a driving style that corresponds to the calculated challenge score.

9. The system of claim 1, wherein the processor is further programmed to operate a vehicle according to the driving action.

10. The system of claim 8, wherein the processor is further programmed to determine that the desired driving style does not correspond to the calculated challenge score by accessing a lookup table, wherein the lookup table relates the plurality of challenge scores to acceptable ones of the plurality of driving styles, and to automatically select a reinforcement learning agent when the desired driving style is determined to not be acceptable with the calculated challenge score.

11. A method for autonomously driving a host vehicle, the method comprising:
receiving sensor data representing a perceived driving environment surrounding the host vehicle;
receiving input from a user of the host vehicle selecting a desired driving style from a plurality of driving styles;
calculating a calculated challenge score from a plurality of challenge scores based on the perceived driving environment;
selecting a reinforcement learning agent from a plurality of reinforcement learning agents based on the calculated challenge score and the desired driving style, wherein each of the plurality of reinforcement learning agents is trained to model the perceived driving environment differently based on a particular combination of one of the plurality of challenge scores and one of the plurality of driving styles; and generating, via the selected reinforcement learning agent, a driving action based on the sensor data.

12. The method of claim 11, wherein the sensed driving environment includes a perceived traffic environment that includes a number of other vehicles proximate the host vehicle, and the challenge score is calculated at least in part based on the perceived traffic environment.

13. The method of claim 11, wherein the desired driving style corresponds to desired level of driving aggressiveness.

14. The method of claim 13, wherein the desired level of driving aggressiveness corresponds to completing the driving action within a particular time period.

15. The method of claim 11, wherein the plurality of reinforcement learning agents comprise M×N reinforcement learning agents, where M is an integer representing M levels of driving preferences and N is an integer representing N number of driving environments.

16. The method of claim 14, further comprising automatically selecting another reinforcement learning agent from the plurality of reinforcement learning agents based on the sensor data representing a different perceived driving environment and a different challenge score within the particular time period.

17. The method of claim 14, further comprising generating, at the end of the particular time period, a reward value quantifying the driving action generated by the selected reinforcement agent.

18. The method of claim 11, further comprising determining, based on the perceived driving environment, that the desired driving style does not correspond to the calculated challenge score and suggesting to the user to modify the desired driving style to a driving style that corresponds to the calculated challenge score.

19. The method of claim 11, further comprising operating the host vehicle according to the driving action.

20. The method of claim 18, vehicle further comprising determining that the desired driving style does not correspond to the calculated challenge score by accessing a lookup table, wherein the lookup table relates the plurality of challenge scores to acceptable ones of the plurality of driving styles, and automatically selecting a reinforcement learning agent when the desired driving style is determined to not be acceptable with the calculated challenge score.

* * * * *